United States Patent [19]
Filan et al.

[11] 3,974,880
[45] Aug. 17, 1976

[54] DRAWBAR ASSEMBLY

[76] Inventors: Alton N. Filan; A. LaVerne Filan, both of, Rte. 1, Box 69, Waitsburg, Wash. 99361

[22] Filed: May 16, 1975

[21] Appl. No.: 578,149

[52] U.S. Cl. ............................ 172/443; 214/130 R
[51] Int. Cl.[2] ................ A01B 59/042; A01B 63/118
[58] Field of Search .......... 172/248, 439, 443, 444, 172/445; 214/130 R, 130 A, 130 C

[56] References Cited
UNITED STATES PATENTS
2,786,589    3/1957    Garrett ......................... 172/443 X Primary Examiner—Paul E. Shapiro
Attorney, Agent, or Firm—Wells, St. John & Roberts

[57] ABSTRACT

A drawbar assembly for transporting three point hitch implements in an elevated or lowered condition by a single point connector towing vehicle. The assembly is wheel supported and mountable between the single point connector of a towing vehicle and the three point connectors of a three point hitch trailing unit such as a plow or other farm implement. The three point connectors are movably mounted relative to a central supporting framework. A jack assembly and appropriate linkage interconnect the three point connectors with the framework to enable movement of the three point connectors and attached implement between an elevated carrying position and a lowered operating position. The jack assembly is operated through provision of conventional accessory drive units provided on the towing vehicle.

7 Claims, 5 Drawing Figures

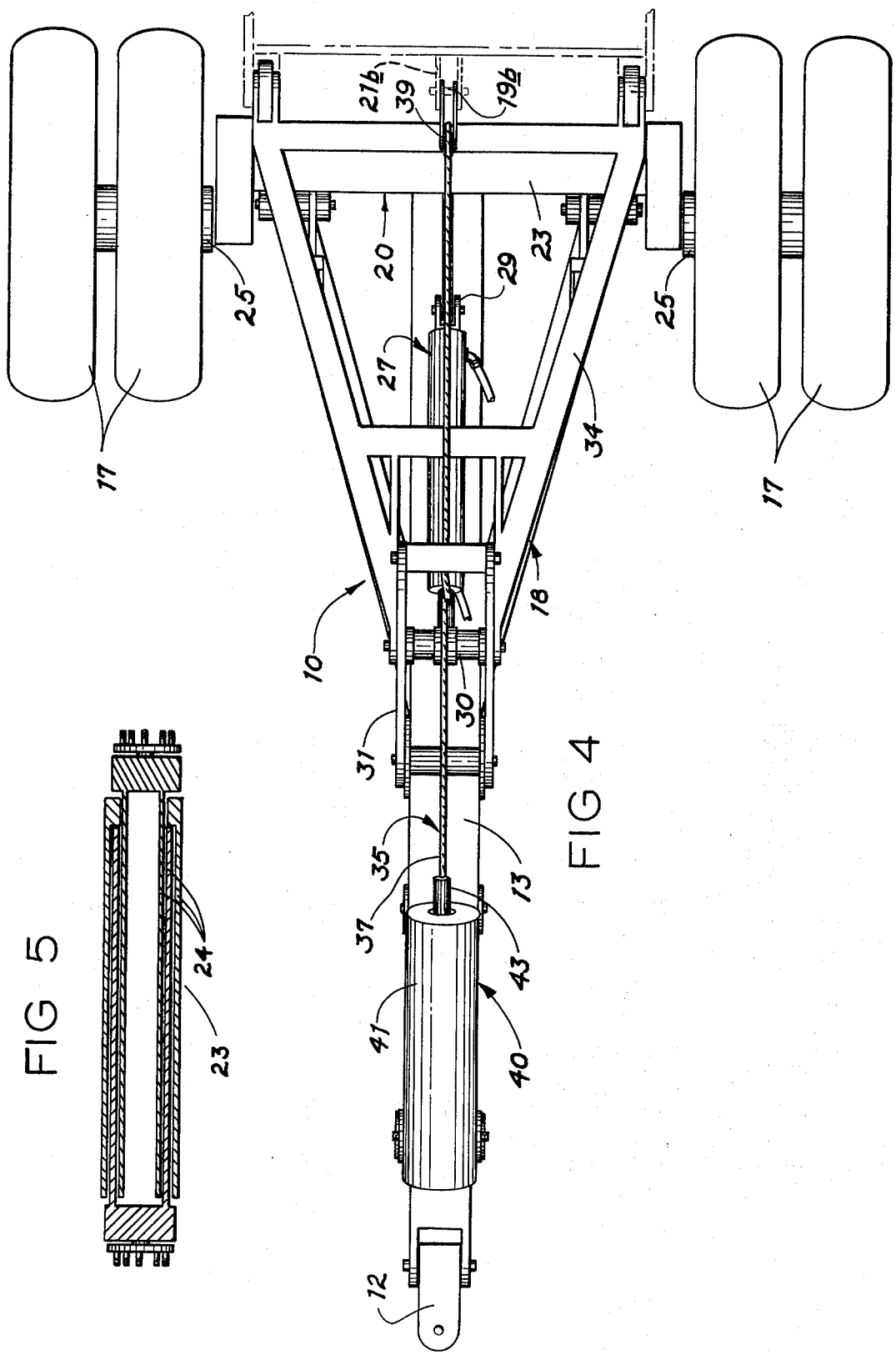

DRAWBAR ASSEMBLY

BACKGROUND OF THE INVENTION

The present invention relates to adaptor assemblies for enabling a three point type trailing unit to be towed behind a draft vehicle having a single point towing connector, and more particularly to such units having a lifting mechanism selectively operable to raise or lower the attached implement while providing support in the raised position.

Modern agricultural technology has led to the development of implements to be towed behind a draft vehicle in ground working operations that are extremely large and equally heavy. Transportation of such implements is becoming increasingly difficult, especially along roadways to and from fields. In addition, such heavy implements when utilized in the field, are ordinarily too heavy to lift into an inoperative position without producing an often dangerous imbalance to the towing vehicle. Further still, it has become desirable to provide some type of mechanism whereby a large crawler type tractor having a single pintle type towing hitch may be operatively connected to a ground working implement having a conventional three point hitch assembly.

The present invention was designed in order to alleviate the above problems by providing both an adaptor to fit intermediate a single point hitch towing vehicle and a three point hitch trailing implement with the added provision of means for elevating the implement to an above ground inoperative position. The present invention further includes provisions for supporting the implement in a raised position without transmitting an excessive load to the towing end of the draft vehicle.

SUMMARY OF THE INVENTION

An adaptor assembly is described for connecting a three point hitch implement to a single point hitch draft vehicle. The adaptor assembly includes a first framework with a forward connector member thereon for operative engagement with a complementary hitch member of the draft vehicle. A secondary wheel supported framework is mounted to the first framework for pivotal movement about a horizontal pivot axis. The secondary framework includes rearwardly facing three point hitch connectors thereon for operative engagement with complementary connectors of the three point hitch implement. A jack means interconnects the first and secondary frames and is operable to pivot the three point connectors and an implement attached thereto relative to the first framework between (a) a first position wherein the implement is held in an operative ground engaging condition and (b) a second position wherein the implement is lifted from the ground and is supported directly by the adaptor assembly.

One object of the present invention is to provide a mechanism whereby a three point hitch trailing implement may be operatively engaged to a single point hitch draft vehicle.

Another object is to provide such a device that may selectively be operated to raise the attached implement to an inoperative elevated position or lower it to an operative ground engaging position.

A further object is to provide such a device that is wheel supported and will carry a substantial amount of the implement weight when held in the elevated inoperative position without transferring such load to the draft vehicle.

It is a still further object to provide such a device that is relatively simple and rugged in construction and is thereby substantially maintenance free.

These and still further objects and advantages will become apparent upon reading the following description which, taken with the accompanying drawings, describe a preferred form of the present invention.

BRIEF DESCRIPTION OF THE DRAWINGS

FIG. 4 is a plan view of the drawbar assembly; and

FIG. 5 is a fragmented section view taken substantially along line 5—5 in FIG. 3.

DETAILED DESCRIPTION OF A PREFERRED EMBODIMENT

Figure 1:
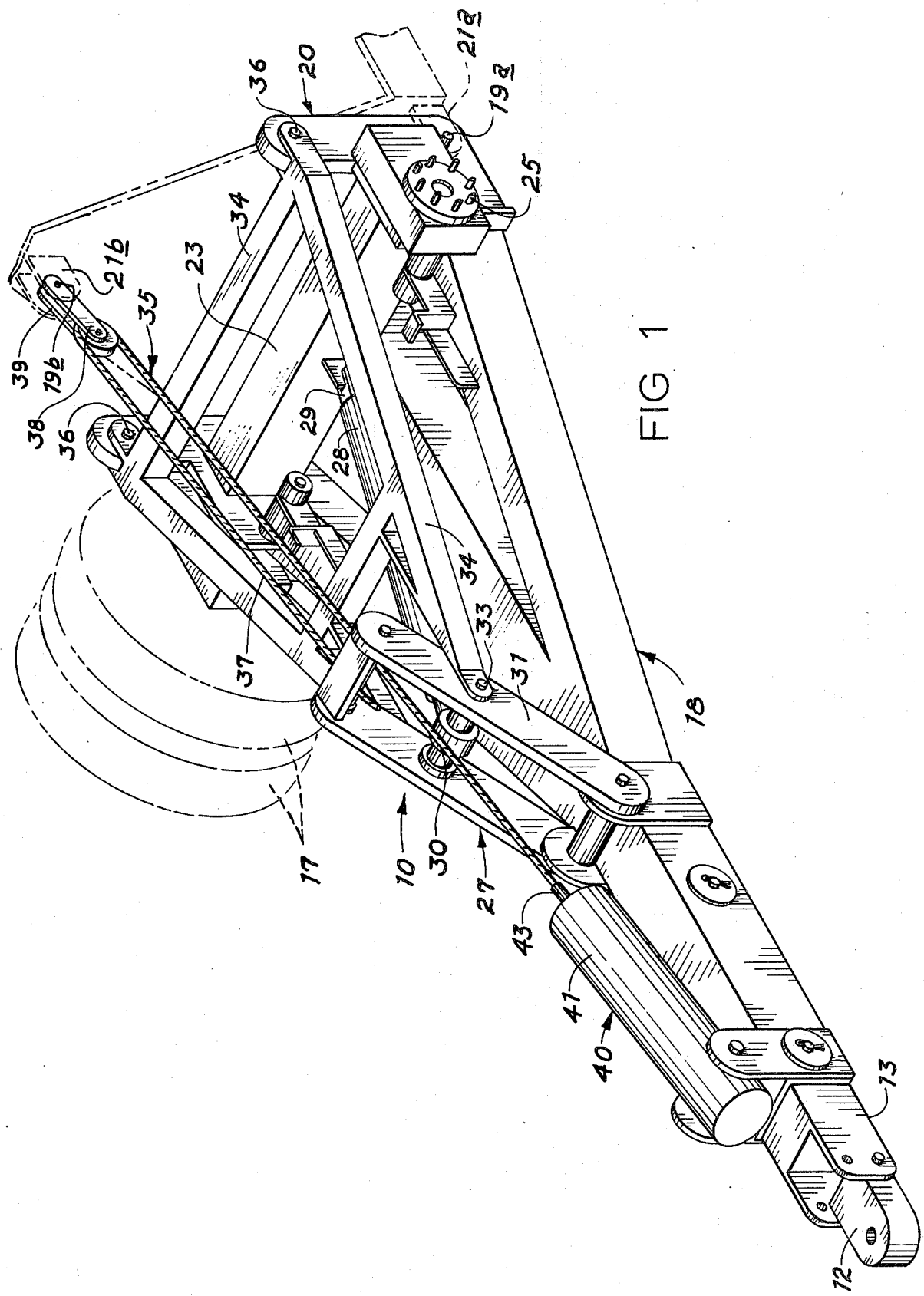
FIG. 1 is an isometric pictorial view of the present invention.
Figure 2:
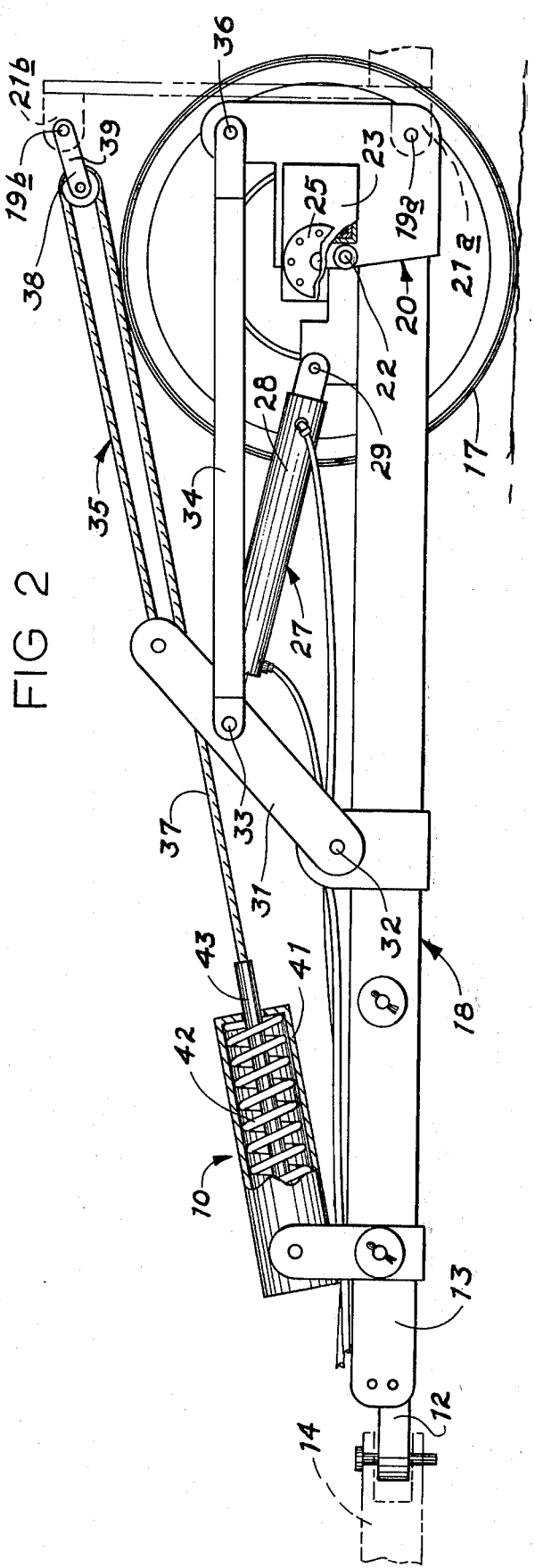
FIG. 2 is a partially fragmented side elevational view.
Figure 3:
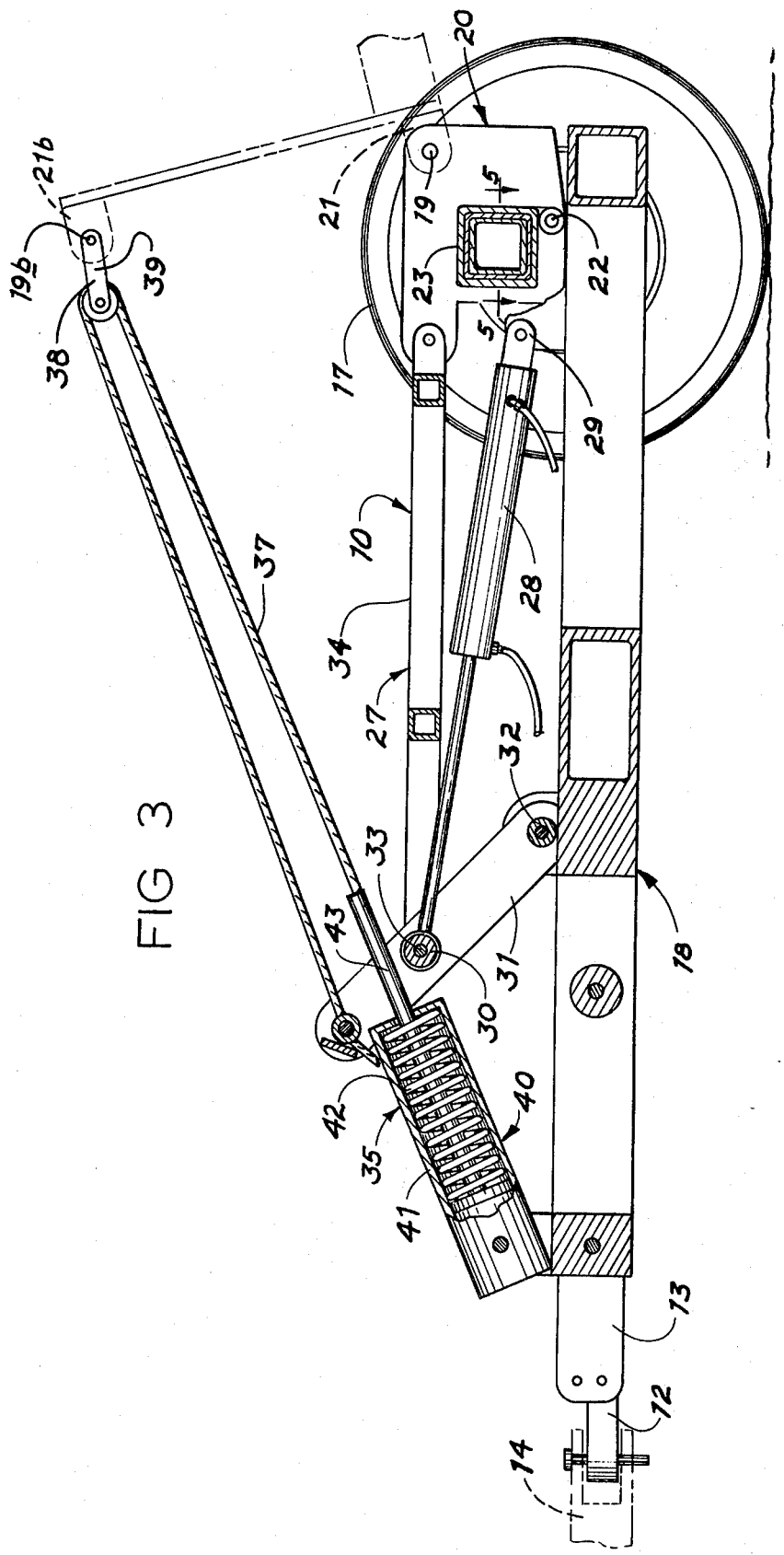
FIG. 3 is a longitudinal section view similar to FIG. 2 only showing a different operational relationship of the elements therein.

The preferred form of the present drawbar adaptor assembly is illustrated by the accompanying drawings and is generally designated therein by the reference character 10. Drawbar adaptor assembly 10 is utilized to adapt a trailing implement (not shown) such as conventional agricultural ground working tools to a draft vehicle. Ordinarily, ground working implements include a three point hitch connector assembly that is adapted to be connected to a complementary set of connectors on a draft vehicle. However, not all draft vehicles include three point connectors, but rather include a single point hitch member as shown at 14 (FIGS. 2 and 3). It is well understood however that the present assembly could be as easily constructed to enable its adaptation to either a single point or a three point hitch connector of a draft vehicle.

The present assembly 10 includes a forward hitch member 12 operatively engageable with a complementary hitch member 14 of the draft vehicle.

The hitch member 12 is pivotably mounted at the forward tongue end of a first framework 18. The pivot connection between frame 18 and member 12 allows some freedom of movement vertically between the towing hitch member 14 and trailing hitch member 12. The tongue portion of framework 18 is indicated at 13. Tongue portion 13 may be extensible, allowing an operator to select the distance between the towing vehicle and trailing implement. A secondary framework 20 is mounted to first framework 18 and includes wheels 17 thereon for supporting nearly all the weight of the assembly plus the weight of an attached implement.

As may be noted in FIGS. 2 and 3, the secondary framework 20 pivots about laterally spaced aligned pivot hinges 22. Three point connectors 19, 19a and 19b are provided at a rearward frame end to receive complementary connectors 21, 21a and 21b of a trailing implement. The lower connectors are located below the hinge axis in a first operative position and above the axis in a second inoperative position.

The wheels 17 are mounted to a transverse axle 23. Axle 23 is comprised of several transverse telescoping channel members 24 as shown in FIG. 5. A wheel hub 25 is mounted at either end of axle 23 to receive single or dual wheels 17 as shown in FIG. 4. It should be noted particularly with reference to FIGS. 2 and 3, that the rotational axis of wheels 17 is offset from the axis of the pivot hinges 22. This is an operational provision and will be discussed in greater detail later on in the specification.

The wheels 17, through provision of extensible channels 24, may be selectively spaced apart to facilitate greater stability while plowing or performing other field working procedures. When drawn together to a compact position as shown in the drawings, the wheels enable transport along highways or narrow roads.

A jack means 27 is provided intermediate the secondary framework 20 and central framework 18 and is operable to pivot the secondary framework 20 about the horizontal axis of hinges 22. Jack means 27 operates to selectively move the secondary framework and an implement attached thereto between the operative position (FIG. 2) and the inoperative elevated position (FIG. 3). Jack means 27 includes a hydraulic cylinder 28. Cylinder 28 is connected at a rearward end 29 to the first central framework 18. A ram end 30 of cylinder 28 is connected to the remainder of the jack assembly. The remaining elements of jack means 27 include a lever arm 31 pivotally mounted to framework 18, and a triangular connecting beam 34 extending between the lever arm 31 and secondary framework 20.

Lever arm 31 is centrally located on framework 18 and is pivotally held for movement about a pivot 32. It may be noted in FIGS. 2 and 3 that a plane containing the pivot axes of hinges 22 and of pivot is parallel to a horizontal ground plane. The connecting beam 34 is pivotally mounted at one end by a pivot 33 to lever arm 31. The remaining end of connecting beam 34 is mounted to secondary framework 20 by a pair of coaxial pivots 36. Pivots 33 and 36 also lie within a horizontal plane and are longitudinally spaced apart by a distance equal to the longitudinal distance between the pivot 32 and hinges 22. This defines a parallelogram type linkage whereby angular pivotal movement of lever arm 31 will result in an equal corresponding angular movement of secondary framework 20 about the axis of hinges 22.

Connecting points 19, 19a and 19b are provided at the rearward end of assembly 10 by the secondary framework 20 and by a linkage means 35 extending from front to rear of the complete assembly. The lower laterally spaced connectors 19 and 19a are formed integrally with the secondary framework 20. These connecting points are shown to best advantage by FIGS. 2, 3 and 4. The upper connecting point 19b is located only by the relative position of the upper connector member 21b of the associated implement. This is so because the upper connecting point of assembly 10 is loosely held by a cable 37 between the framework 18 and secondary framework 20. Cable 37 forms a part of linkage means 35. Linkage means 35 also includes a sheave 38 and shock absorbing means 40. The shock absorbing means 40 is pivotally mounted toward the forward end of framework 18. Cable 37 extends rearwardly from means 40 and over sheave 38. Sheave 38 is held by a clevis 39 that is connectable to the hitch point 21b of the towing vehicle. The cable 37 then extends forwardly toward lever arm 31 where it is connected for movement therewith.

Shock absorbing means 40 includes a relatively strong compression spring 42 and a plunger member 43 that is secured to cable 37. Tension applied to the cable 37 will result in compression of spring 42 within its cylindrical cannister 41 holder. Therefore, as the jack means is operated to move the implement to the raised position, the cable 37 is also actuated to draw the connecting points 19b and 21b rearwardly. The primary purpose of compression spring 42 is to compensate for road shocks when the implement is being carried in the inoperative position. Rather than providing a rigid connection that would transfer objectionable movement to the implement, such undesired movement is taken up as spring 42 compresses and extends under the levered weight of the trailing implement.

In order for operation, the present assembly must first be attached to a towing vehicle with its hitch member 14 operatively engaging the hitch member 12 of the present assembly. When thus connected, the assembly is backed into position in contact with the three point hitching elements 21, 21a and 21b of a selected implement. The corresponding hitch points 19, 19a and 19b and 21, 21a and 21b are then joined, and cylinder 28 is connected to the hydraulic pressure supply of the draft vehicle.

To elevate the implement then for highway travel, the jack means 27 is operated, extending cylinder 28. This motion results in corresponding pivotal movement of the parallelogram linkage defined by lever arm 31 and connecting beam 34, along with secondary framework 20 and framework 18. The forward pivotal movement of jack means 27 results in corresponding pivotal movement of the secondary framework about the axis of hinges 22. As shown in FIG. 3, this movement also results in upward pivotal movement of the lower hitch points 19, 19a to the location shown in FIG. 3. It should be noted that the amount of elevational movement of hitch points 19, 19a is effected not only by their rotational movement about the axis of hinges 22, but also by the pivotal movement of the wheel axis about the axis of hinges 22. Thus, as the secondary frame is pivoted, the hitch points 19, 19a are raised relative to frame 18 and framework 18 is raised simultaneously relative to the ground.

While jack means 27 is operating to elevate the lower hitch points, the linkage means 35 operates simultaneously in response to the jack means to pull the upper hitch point forwardly. This movement results as the lever arm 31 pulls against cable 37. Thus, through linkage means 35, the upper implement connector 21b is pulled along an upright arcuate path forwardly to tip the implement upwardly as it is being raised by frame connectors 19 and 19a. If a rigid connection is made between the three point connectors and the implement, the implement will be raised to an elevated condition and supported only through the wheels 17 and forward hitch 12. Therefore, the vertical downward load of the implement is not transferred to the rearward end of the towing vehicle. Rather, the weight operates across the wheel axis (which functions as a fulcrum) to actually produce a small amount of lift to the rearward end of the draft vehicle.

To move the implement back to an operative position as shown in FIG. 2, the cylinder 28 is actuated to retract. This movement causes the corresponding elements including secondary framework 20 to pivot rearwardly. In doing so, the lower connecting points are pivoted downwardly about the axis of hinges 22 and the wheel axis is pivoted simultaneously upwardly and forwardly. Further, as the lever arm is pivoted rearwardly, the cable 37 is allowed to release tension on the sheave 28 and compression spring 42, allowing the upper connecting point to return to a normal position.

The above description and attached drawings describe only a preferred form of our invention. It is well understood that various changes can be made therefrom without departing from the scope of this invention. Therefore, only the following claims are to be taken as restrictions placed upon the scope of our invention.

What we claim is:

1. A drawbar adapter assembly for connecting a three-point hitch implement to a single point hitch draft vehicle, comprising:
   a first framework;
   a forward connector member on said first framework for operative engagement with a complementary hitch member of a draft vehicle;
   a secondary framework mounted to said first framework for pivotal movement about a horizontal pivot axis and having three rearwardly facing three-point hitch connectors thereon for operative engagement with complementary connectors of a three-point hitch implement;
   a laterally spaced set of wheels mounted to the secondary framework for free rotation about a horizontal wheel axis wherein said wheel axis is parallel to and spaced from the horizontal pivot axis of the secondary framework; and
   jack means interconnecting the first and secondary frames and operable to pivot said three-point connectors and attached implement relative to said first framework between (a) an operative position wherein the implement is held in an operative ground engaging condition for movement behind the draft vehicle and (b) an inoperative position wherein the implement is lifted from the ground and is supported directly by said adapter assembly.

2. A drawbar adapter assembly for connecting a three-point hitch implement to a single point hitch draft vehicle, comprising:
   a first framework;
   a forward connector member on said first framework for operative engagement with a complementary hitch member of a draft vehicle;
   a secondary framework mounted to said first framework for pivotal movement about a horizontal pivot axis and having three rearwardly facing three-point hitch connectors thereon for operative engagement with complementary connectors of a three-point hitch implement;
   wheel means for movably supporting the first and second frames above the ground surface;
   jack means interconnecting said first and secondary frames and operable to pivot said three-point connectors and attached implement relative to said first framework between (a) an operative position wherein the implement is held in an operative ground engaging condition for movement by the draft vehicle and (b) an inoperative position wherein the implement is lifted from the ground and is supported directly by said adapter assembly;
   wherein two of said three-point hitch connectors are located on the secondary framework along a first connector axis parallel to and rearward of said secondary framework pivot axis so that in said operative position, said first connector axis is located elevationally below said secondary framework pivot axis and in said inoperative position, said first connector axis is located elevationally above said pivot axis; and
   linkage means movably mounting a third connector of said three point connectors and interconnecting the first framework and said jack means for moving said third connector in response to said jack means in an upright arcuate path.

3. The adapter assembly as defined by claim 2 further comprising:
   shock absorbing means connected between said linkage means and first framework for dampening transmission of vibration from said first framework to an implement supported by said adapter assembly.

4. The adapter assembly as defined by claim 2 wherein said jack means is comprised of:
   a hydraulic cylinder connected at one end to the first framework;
   a lever arm pivotably mounted to the first framework and connected to the remaining end of said cylinder for pivotal movement in response thereto;
   a connecting beam pivotably mounted at one end to said lever arm, with a remaining beam end pivotably mounted to said secondary framework at a pivot point spaced from said horizontal pivot axis.

5. The adaptor assembly as defined by claim 4 wherein said linkage means is connected to said lever arm for movement therewith in response to operation of said cylinder.

6. The adaptor assembly as defined by claim 5 further comprising:
   shock absorbing means connected between said linkage means and first framework for dampening transmission of vibration from said first framework to an implement supported by said adaptor assembly.

7. A drawbar adapter assembly for connecting a three-point hitch component to a single point hitch draft vehicle, comprising:
   a first framework;
   a forward connector member of first said framework for operative engagement with a complementary hitch member of a draft vehicle;
   a secondary framework mounted to said first framework for pivotal movement about a horizontal pivot axis and having three rearwardly facing three-point hitch connectors thereon for operative engagement with complementary connectors of a three-point hitch implement;
   wheel means for movably supporting the first and second frames above the ground surface;
   jack means interconnecting said first and secondary frames and operable to pivot said three-point connectors and attached implement relative to said framework between (a) an operative position wherein the implement is held in an operative ground engaging condition for movement behind the draft vehicle and (b) an inoperative position wherein the implement is lifted from the ground and is supported directly by said adapter assembly;
   wherein said jack means includes a hydraulic cylinder connected at one end to the first framework;
   a lever arm pivotably mounted to the first framework and connected to the remaining end of said cylinder for pivotal movement in response thereto; and
   a connecting beam pivotably mounted at one end to said lever arm with a remaining beam end pivotably mounted to said secondary framework at a pivot point spaced from said horizontal pivot axis.

* * * * *